United States Patent [19]

Diggs

[11] 4,017,958
[45] Apr. 19, 1977

[54] IRRIGATION APPARATUS

[76] Inventor: Richard E. Diggs, 12A Road R3, P.O. Box 776, Carthage, Mo. 64836

[22] Filed: Dec. 11, 1975

[21] Appl. No.: 639,860

Related U.S. Application Data

[60] Division of Ser. No. 549,556, Feb. 13, 1975, Pat. No. 3,966,233, which is a continuation-in-part of Ser. No. 498,181, Aug. 16, 1974, Pat. No. 3,973,732, which is a division of Ser. No. 213,927, Dec. 30, 1971, Pat. No. 3,833,019.

[52] U.S. Cl. .............................. 29/268; 81/425 A
[51] Int. Cl.² ....................................... B23P 19/04
[58] Field of Search ............ 81/425 R, 425 A, 426; 29/268, 237

[56] References Cited

UNITED STATES PATENTS

| | | | |
|---|---|---|---|
| 232,428 | 9/1880 | Whiting | 81/426 X |
| 2,934,983 | 5/1960 | Daggitt | 81/425 R X |
| 3,218,696 | 11/1965 | Dritz | 81/426 X |

Primary Examiner—James L. Jones, Jr.
Attorney, Agent, or Firm—Shoemaker and Mattare, Ltd.

[57] ABSTRACT

The irrigation apparatus includes a quick-connect, self-piercing drip emitter insertable in a plastic pipe to effect a controlled, localized trickle of irrigating water. The apparatus is usable either above the surface of the ground or below the surface and may include a protective wrap to keep dirt from clogging the emitter and to spread the flow of irrigating water over a larger area.

1 Claim, 11 Drawing Figures 4,017,958

IRRIGATION APPARATUS

BACKGROUND OF THE INVENTION

This is a division of application Ser. No. 549,556, filed Feb. 13, 1975, now U.S. Pat. No. 3,966,233, which is a continuation-in-part of application Ser. No. 498,181, filed Aug. 16, 1974, now U.S. Pat. No. 3,973,732, which is in turn, a division of application Ser. No. 213,927, filed Dec. 30, 1971, and now U.S. Pat. No. 3,833,019.

This invention relates to a trickle type irrigation system and to fittings for use therein wherein irrigating water is caused to trickle or drip in a controlled root zone area to be irrigated at a very low rate of flow and thus to conserve irrigating water and to eliminate mass flooding of an irrigated area and the consequent damage to irrigated crops and the like. Further, with the invention the irrigating water is not sprayed over a large area or on leaf foilage or the like and surface evaporation is thus substantially eliminated, with a reduction of loss of irrigating water of about 40%. Still further, the time and expense of installing the irrigating system of the invention is considerably less than with prior art systems.

It is becoming increasingly more important for larger and higher quality yields of crops to be achieved in order for farming to be economically productive. Moreover, there is a severe shortage of personnel available to irrigate crops and the cost of labor for irrigation is extremely high. Further, the shortage of water available for irrigation has resulted in spiralling costs of irrigation water and new methods of irrigation have become necessary. Recent developments have included low cost plastic piping materials and devices to apply irrigating water to a controlled root zone area to be irrigated at a very low flow rate in order to conserve irrigating water. Such devices have been devised for use both above ground and below ground, as exemplified by my U.S. Pat. No. 3,630,236.

The present invention provides means which significantly simplify and reduce the cost of the physical components and the cost of installation and labor of trickle type irrigation systems.

With the present invention, no piercing tools or wrenches and the like are needed in order to connect together the fittings and pipes and the like in an irrigation system, and the connections between main lines and branch lines and drip type fittings and the like can be accomplished quickly and easily with a resultant substantial savings in labor and cost.

The drip emitter according to the invention is a simple calibrated orifice fitting with a shrouded discharge with a piercing means on one end thereof for quick and easy connection to a plastic water supply pipe. The shroud prevents a spray of water and instead, the water strikes the shroud and is caused to fall in a puddle. The drip emitters are provided in several sizes, color coded, for use in hilly terrain or on long irrigation lines where excessive pressure drop is encountered.

Moreover, a special tool is disclosed herein for use in installing the drip emitter to a plastic line.

OBJECTS OF THE INVENTION

It is an object of this invention to provide fittings for a trickle type irrigation system, wherein plastic pipes and the like may be quickly and easily joined together in a secure and leakproof manner without the use of tools or the like, thus resulting in a substantial savings in labor and cost.

Another object of this invention is to provide a fitting for an irrigation system wherein the fitting has a piercing means on one end thereof for penetrating the side of a plastic pipe to automatically and sealingly connect the fitting to the plastic pipe.

Another object is to provide a self-piercing drip emitter having a shrouded discharge for confining irrigating water to a local area and thus preventing excessive loss of irrigating water due to evaporation, and further wherein a plastic wrap is disposed around the emitter and adjacent portion of the pipe, when the pipe and emitter are disposed beneath the surface of the ground, to keep the emitter from being clogged with the dirt and to spread the water over a larger area.

A still further object is to provide a special tool for installing a self-piercing irrigation fitting.

BRIEF DESCRIPTION OF THE DRAWINGS

FIG. 9 is a view similar to FIG. 4, but showing the pipe and emitters disposed above the surface of the ground, as in a lawn or garden or the like.

FIG. 10 is a view similar to FIG. 9, but with the pipe and drip emitters buried deep beneath the surface of the ground, as for example to irrigate annual crops and wherein the pipe and emitters are beneath the depth to which the earth is plowed and the like.

DETAILED DESCRIPTION OF THE INVENTION

Figure 1:
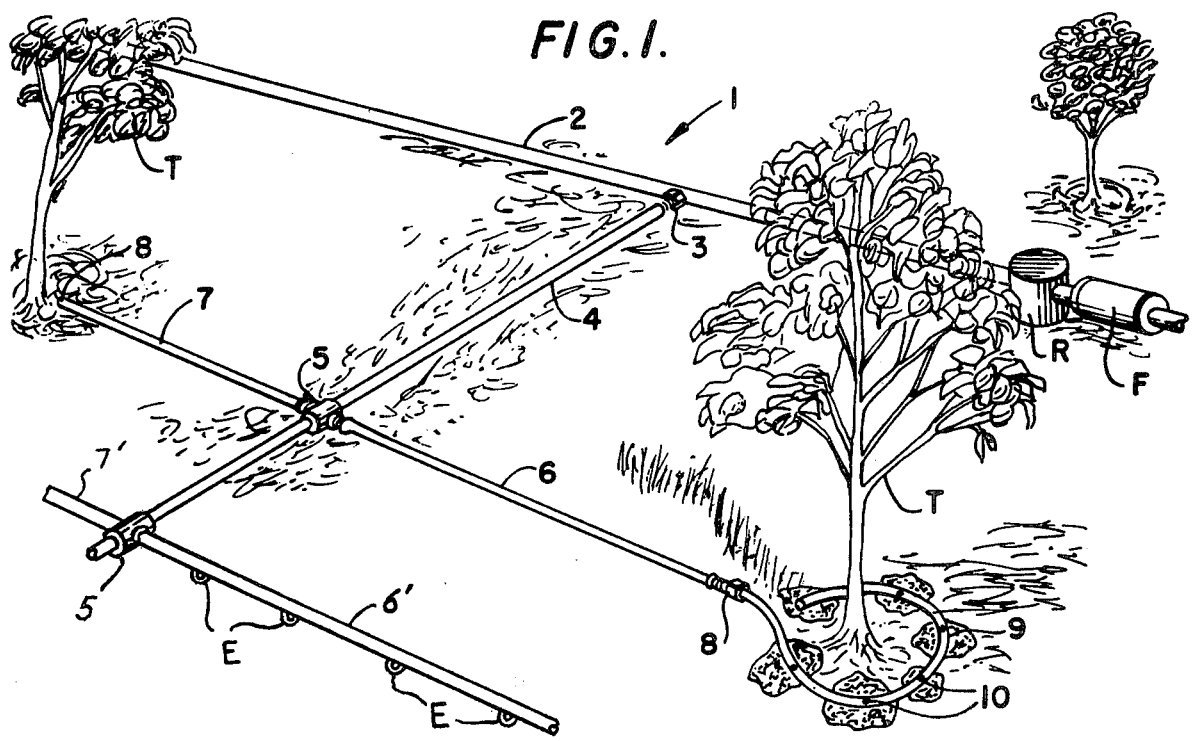
FIG. 1 is a top perspective view of a trickle type irrigation system according to the present invention and utilizing the fittings of the present invention.

Referring now more particularly to the drawings, wherein like reference numerals indicate like parts throughout the several views, a trickle type irrigation system is indicated generally at 1 in FIG. 1 and comprises a relatively large main line 2 having a filter F and regulator R therein for filtering and regulating the flow of irrigating water therethrough.

A piercing fitting 3 is connected to the main line 2 and a first branch line 4 is connected to the piercing fitting 3 and thus to the main line 2. A plurality of cross-type fittings 5 are interposed in the branch line 4 and a plurality of secondary branch lines 6 and 7 and 6' and 7' are joined thereto and extend in opposite directions therefrom. The secondary branch lines 6 and 7 extend at their ends to adjacent the root zones of crops to be irrigated, such as fruit trees T or the like, and an adjustable orifice fitting 8 is fixed to each of the branch lines 6 and 7 at their outer ends for restricting the rate of flow of irrigating water from the branch lines. The orifice fitting 8 is more fully described in my copending application Ser. No. 498,181. The branch lines 6' and 7' extend to areas to be irrigated and have a plurality of drip emitters E assembled thereto.

An optional, secondary distribution tube 9, with or without calibrated outlets 10, such as emitters E, for example, is attached to the adjustable orifice fitting 8 at the end of branch line 6 and extends around the tree T for further control of the water to the root zone of the tree. The distribution tube 9 could also be extended along a row of crops or the like, if desired.

Figure 2:
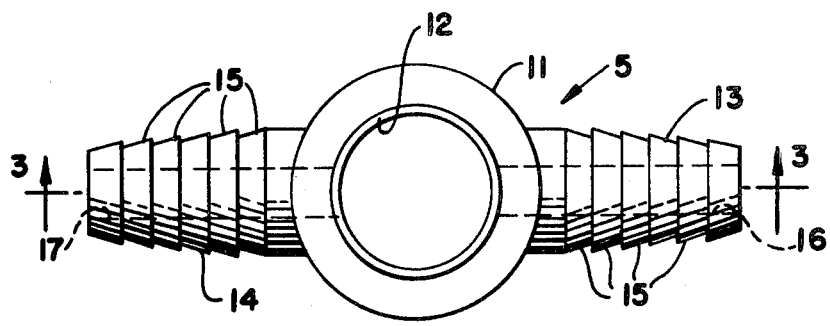
FIG. 2 is a top view of a fitting for joining together a relatively large main line and a plurality of smaller branch lines.
Figure 3:
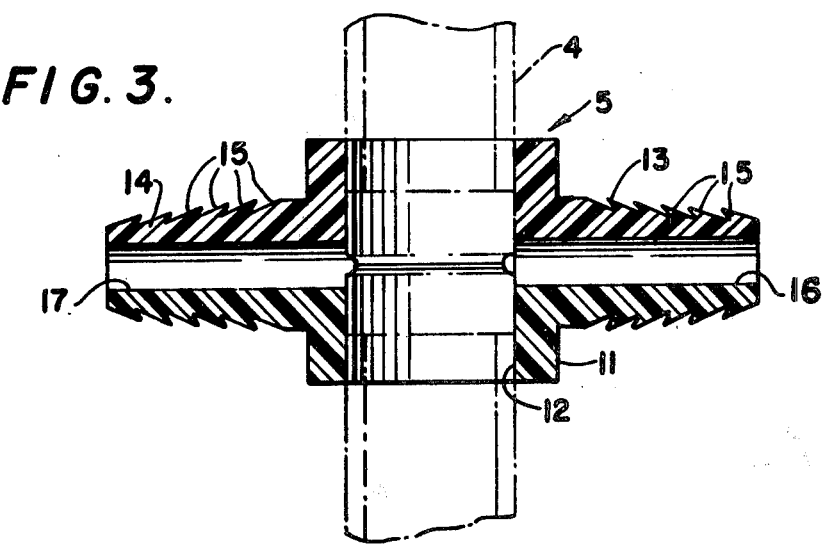
FIG. 3 is a view in section of the fitting of FIG. 2 and is taken along line 3—3.

In FIGS. 2 and 3, the construction of the cross-type fitting 5 can more clearly be seen. The cross-type fitting includes a cylindrical body 11 having a cylindrical bore 12 therethrough, in the opposite ends of which a branch line or main line or the like 4 is adapted to be received and secured in a conventional and well-known manner. A pair of tapered nipples 13 and 14 extend laterally from the cylindrical body 11 on diametrically opposite sides thereof and the nipples 13 and 14 have serrations 15 on the external tapered surface thereof.

The nipples 13 and 14 have longitudinal bores 16 and 17 therein, respectively, communicating at their inner ends with the bore 12 through the cylindrical part 11 of fitting 5. In a preferred embodiment, the bores 16 and 17 through the nipples 13 and 14 each have the same diameter and their diameter is less than the diameter of the bore 12.

By way of specific example, the outer surface of each of the nipples 13 and 14 is tapered approximately 10° with respect to the longitudinal axis of the nipple and the serrations 15 are inclined approximately 20° relative to the longitudinal axis of the nipples. The serrations 15 are approximately 1/16 of an inch long on a nipple having a diameter at the small end thereof on the order of 0.170 inches, and a length of approximately ¾ of an inch. There are approximately eleven serrations or lands on each such nipple to allow for at least three different sizes of hose to be used on any one fitting, which reduces tooling costs and inventory costs to customer, dealer and manufacturer. This arrangement has been found to be best and is necessary for maximum sealing and gripping power. The fitting is preferably made of a synthetic plastic material by the extrusion molding method, although it could be made from a metallic or other suitable material as desired. Further, although a fitting having two nipples thereon is specifically illustrated and described, it is to be understood that one or any number of nipples 13 and 14 could be provided on the fitting if desired, and one end of the bore 12 could be closed if desired so that the fitting would comprise a T-fitting or the like, or one end could be reduced in size to continue on through a smaller supply line.

Figure 4:
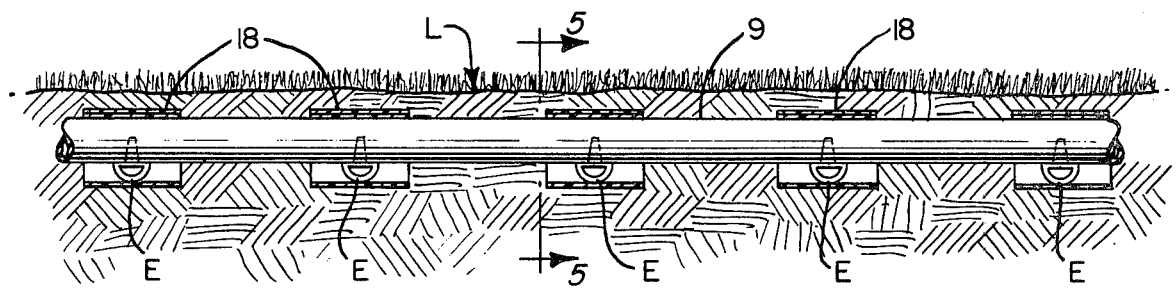
FIG. 4 is a sectional view of a length of plastic pipe embedded just beneath the surface of the ground, as for irrigating a lawn or the like, and with a plurality of drip emitters according to the present invention installed thereto.
Figure 5:
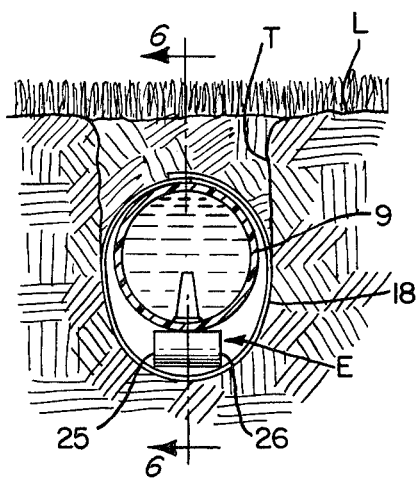
FIG. 5 is an enlarged view in section taken along line 5—5 in FIG. 4.
Figure 6:
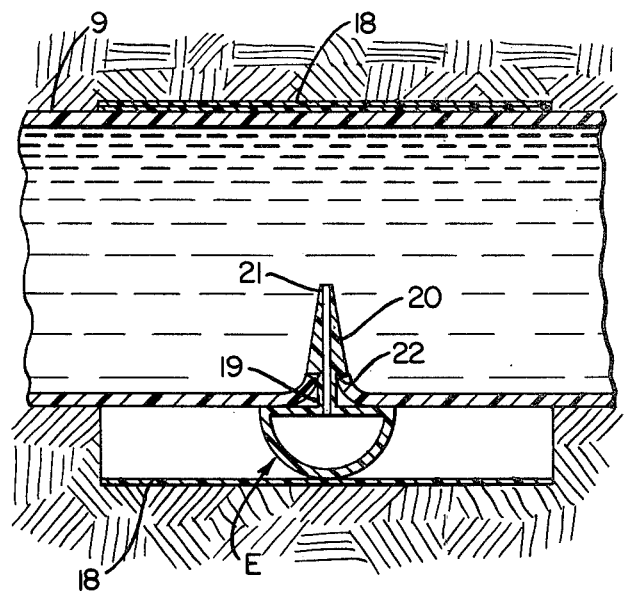
FIG. 6 is a greatly enlarged sectional view taken along line 6—6 of FIG. 5.

In FIGS. 4, 5 and 6, the distribution line or pipe 9 is shown buried immediately beneath the surface, as for irrigating a lawn L or the like, and a plurality of emitters E are attached thereto, and a rectangularly shaped swatch 18 of plastic or other similar material is wrapped around the tube 9 and each emitter E to shield the emitter against entry of dirt thereinto and to also spread the water over a slightly greater area than would be accomplished if the swatch were not wrapped around the emitters E.

Figure 7:
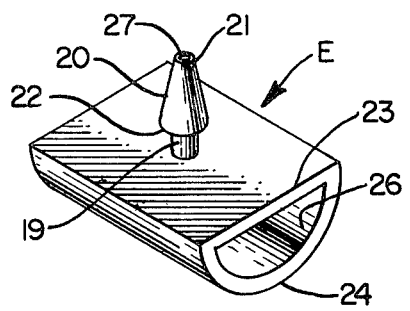
FIG. 7 is a bottom perspective view of the drip emitter.
Figure 8:
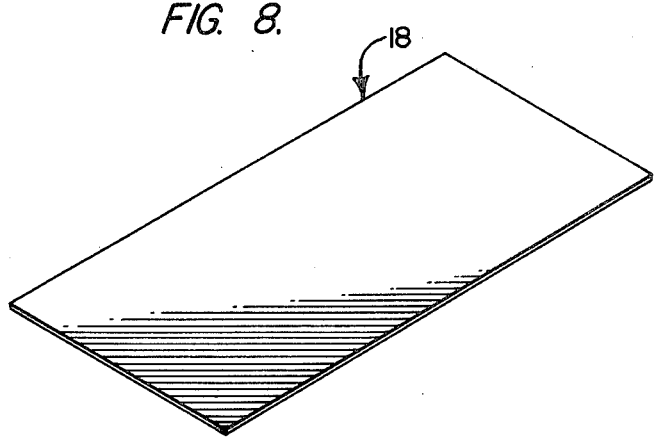
FIG. 8 is a perspective view of the wrap used to protect the emitter as shown in FIGS. 4, 5 and 6.

As seen in FIG. 7, the emitters E each comprise a neck or projection 19 having a tapered enlarged head or end 20, with a penetrating end 21 and a retaining shoulder 22. The neck 19 terminates in the center of the flat side 23 of a hollow, semi-cylindrical shroud 24 having opposite open ends 25 and 26, and with the axis of the shroud extending An opening or orifice 27 extends through the flat side of the shroud and through the neck 19 to establish fluid communication between the interior of pipe 9 and the open ends of the shroud 24.

The wrap 18 is preferably made of black polyethylene sheet 0.004 inches thick, and having dimensions of 6 inches by 12 inches. The emitters are preferably installed on the underside of the pipe for drainage of water from the pipe to prevent freeze damage during cold weather. Also, the emitters, or at least the passageway through the emitters, are made in various sizes, as, for example, five different sizes, and the emitters are color coded according to the different sizes so that they can be used to provide uniform flow to each plant or irrigated area over hilly terrain and on long distribution lines or pipes where above normal pressure drop would exist.

Figure 9:
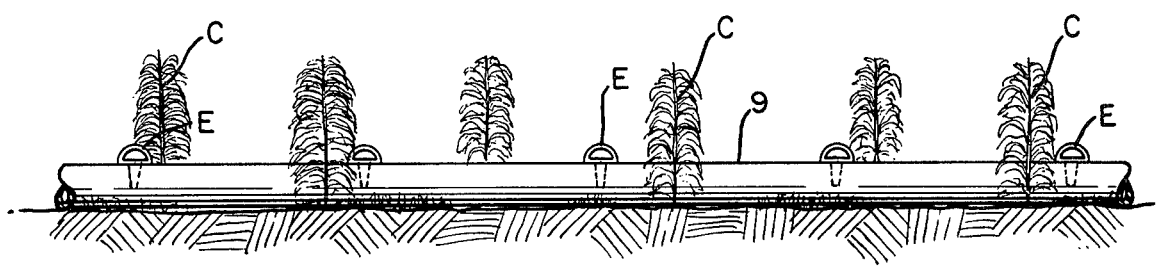

In FIG. 9 the emitters E are shown installed on a distribution pipe or line 9 disposed on the surface of the ground for irrigating areas such as gardens or lawns or the like. The emitters E may be installed on the upper surface of the pipe, as shown in FIG. 9, or if freeze damage is likely to occur, they may be placed on the bottom side of the pipe to enable drainage of the pipe and thus prevent freeze damage during cold weather.

Figure 10:
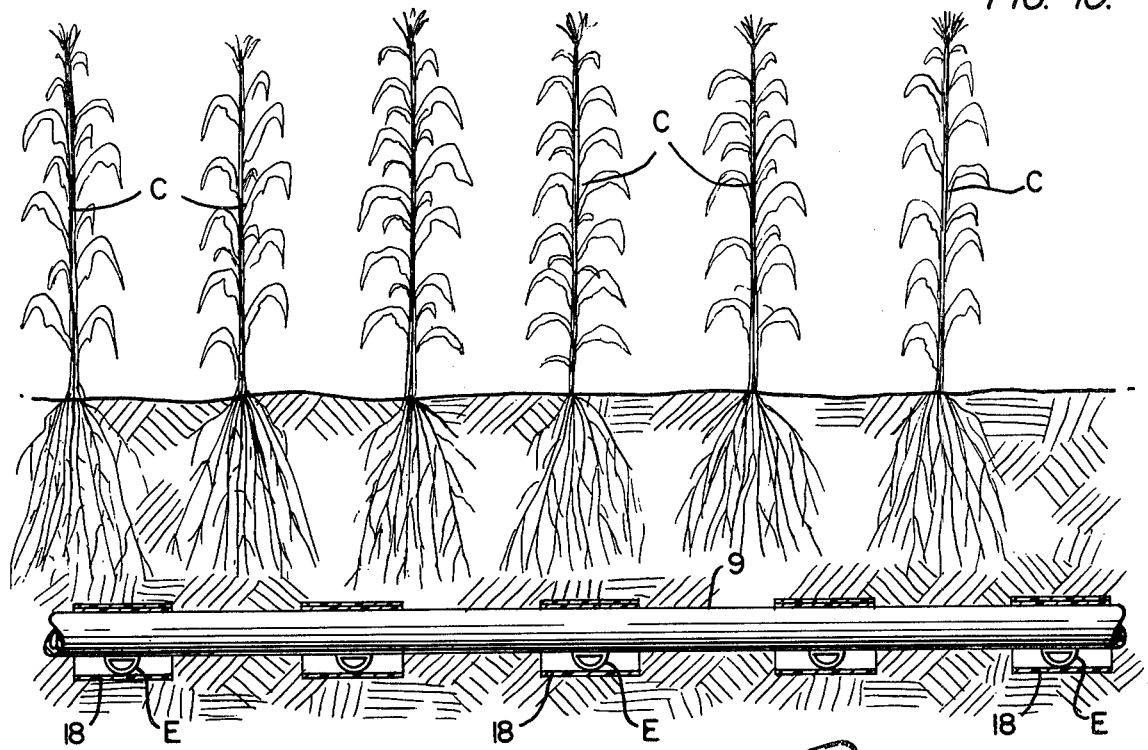

In FIG. 10, the emitters E are shown installed on a distribution line or pipe 9 disposed beneath the plow or tillage depth of soil beneath annual field crops such as corn C or the like, so that the irrigation apparatus may be left in the ground. The depth to which the pipe 9 and emmiters E is placed may be on the order of 12–15 inches, for example.

Figure 11:
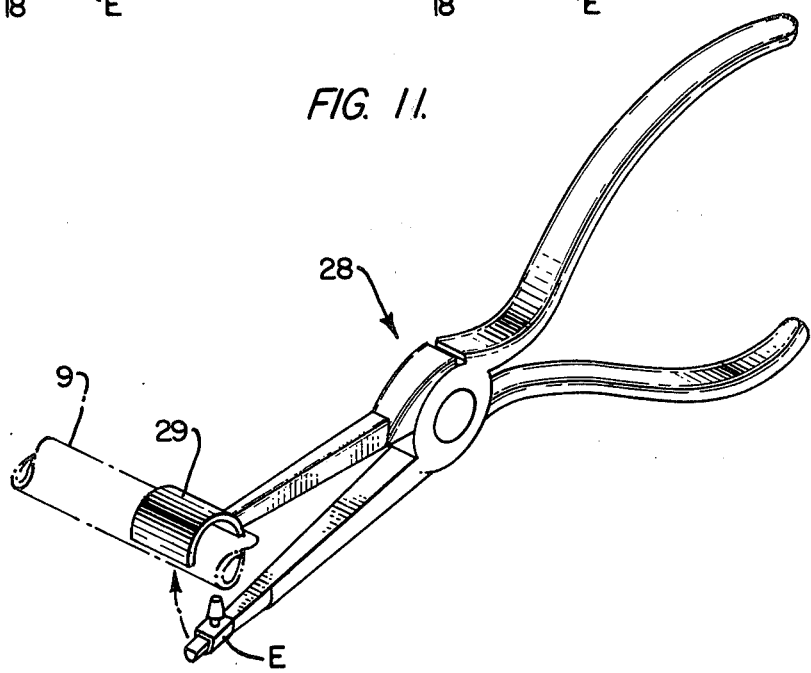
FIG. 11 is a perspective view of the special installing tool for use in installing the self-piercing drip emitter to a plastic pipe.

In FIG. 11 a special tool 28 is provided for aiding in the installation of the emitters E to the plastic pipe 9, and the tool 28 comprises a modified pair of needle nose or long nose pliers. The pliers have tapered gripping jaws or extensions wherein a substantially semi-cylindrically shaped backup member 29 is suitably secured or fixed on the gripping end of one of the extensions of the pliers, and the other end of the plier fits within the shroud of the emitter E, whereby upon manipulating the handles of the pliers toward one another the piercing head or end of the emitter is forced through the side of the plastic pipe 9. As shown, the back of the member 29 extends outwardly of the back surface of one extension, and the backing member has a pair of ends which each extend beyond the sides of that extension, and the two gripping jaws are essentially co-extensive.

With the present invention a trickle type irrigation system can be quickly and easily assembled without the use of skilled and expensive labor and without requiring the use of special tools and the like, it being necessary simply to push the fittings and pipes comprising the irrigation system together to effect a secure and leaktight connection therebetween. The tool 28 of FIG. 11 can be used, if desired, to expedite assembly of the drip emitters E to the pipe.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A tool for installing a self-piercing irrigation fitting to a length of plastic pipe, comprising:

a long-nose plier having a pair of tapered gripping jaws with one jaw having a gripping end portion which has a first tip and a flat face presented toward the other gripping jaw, the taper of said one jaw being sufficient to receive the fitting which is to be forced into the pipe, and the other jaw having a back surface, a pair of side surfaces and a second tip; and a semi-cylindrical backing member for supporting a pipe to which the fitting is being installed, said backing member having a pair of sides with one side integrally attached to said second tip and the other side located to coincide with said first tip, said backing member having a back surface which extends outwardly of said back surface and a pair of ends which are each located outwardly of each of said side surfaces so that the inner surface of said backing member is presented toward said one jaw flat face so that pipe held in said backing member is located above said one jaw flat face.

* * * * *